(12) United States Patent
Le et al.

(10) Patent No.: US 10,990,899 B2
(45) Date of Patent: Apr. 27, 2021

(54) DEEP AND WIDE MACHINE LEARNED MODEL FOR JOB RECOMMENDATION

(71) Applicant: Microsoft Technology Licensing, LLC, Redmond, WA (US)

(72) Inventors: Benjamin Hoan Le, San Jose, CA (US); Saurabh Kataria, Newark, CA (US); Nadia Fawaz, Santa Clara, CA (US); Aman Grover, Sunnyvale, CA (US); Guoyin Wang, Durham, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 902 days.

(21) Appl. No.: 15/674,968

(22) Filed: Aug. 11, 2017

(65) Prior Publication Data
US 2019/0050750 A1 Feb. 14, 2019

(51) Int. Cl.
*G06N 20/00* (2019.01)
*G06N 3/08* (2006.01)
(Continued)

(52) U.S. Cl.
CPC ........... *G06N 20/00* (2019.01); *G06F 3/0482* (2013.01); *G06F 16/906* (2019.01);
(Continued)

(58) Field of Classification Search
CPC ............... G06F 16/9024; G06F 16/906; G06F 16/9535; G06F 16/958; G06F 3/0482;
(Continued)

(56) References Cited

U.S. PATENT DOCUMENTS

2017/0004455 A1* 1/2017 Tang et al.
2018/0232700 A1* 8/2018 Li et al. ............. G06Q 10/1053

OTHER PUBLICATIONS

Jahrer et al., "Combining predictions for accurate recommender systems", Jul. 2010, KDD '10: Proceedings of the 16th ACM SIGKDD international conference on Knowledge discovery and data mining, pp. 693-702 (Year: 2010).*
(Continued)

*Primary Examiner* — Kamran Afshar
*Assistant Examiner* — Brent Johnston Hoover
(74) *Attorney, Agent, or Firm* — Schwegman Lundberg & Woessner, P.A.

(57) ABSTRACT

In an example, features in a boosting decision tree model are initialized to zero, the boosting decision tree model located in a GLMM and connected to a deep neural network collaborative filtering model via a prediction layer. While the features in the boosting decision tree model remain zero, the deep neural network collaborative filtering model is trained. One or more trees in the boosting decision tree model are boosted using logits produced by the training of the deep neural network collaborative filtering model as a margin. The prediction layer is trained using features from the deep neural network collaborative filtering model and features from the boosting decision tree model. It is then determined whether a set of convergence criteria is met. If not, then the deep neural network collaborative filtering model is retrained using the features and the process is repeated until the set of convergence criteria is met.

20 Claims, 14 Drawing Sheets

(51) Int. Cl.
| | |
|---|---|
| *H04L 29/08* | (2006.01) |
| *G06Q 10/10* | (2012.01) |
| *G06F 3/0482* | (2013.01) |
| *G06F 16/958* | (2019.01) |
| *G06F 16/9535* | (2019.01) |
| *G06F 16/906* | (2019.01) |
| *G06F 16/901* | (2019.01) |
| *G06N 3/04* | (2006.01) |
| *G06N 5/00* | (2006.01) |
| *G06N 20/20* | (2019.01) |
| *G06Q 50/00* | (2012.01) |

(52) U.S. Cl.
CPC ........ *G06F 16/9024* (2019.01); *G06F 16/958* (2019.01); *G06F 16/9535* (2019.01); *G06N 3/0427* (2013.01); *G06N 3/08* (2013.01); *G06N 5/003* (2013.01); *G06N 20/20* (2019.01); *G06Q 10/1053* (2013.01); *H04L 67/306* (2013.01); *G06N 3/0481* (2013.01); *G06Q 50/01* (2013.01)

(58) Field of Classification Search
CPC ...... G06N 20/00; G06N 20/20; G06N 3/0427; G06N 3/0481; G06N 3/08; G06N 5/003; G06Q 10/1053; G06Q 50/01; H04L 67/306
See application file for complete search history.

(56) References Cited

OTHER PUBLICATIONS

Zhang et al., "GLMix: Generalized Linear Mixed Models for Large-Scale Response Prediction", Aug. 2016, KDD '16: Proceedings of the 22nd ACM SIGKDD International Conference on Knowledge Discovery and Data Mining, pp. 363-372 (Year: 2016).*
Hady et al., "Semi-supervised learning for tree-structured ensembles of RBF networks with Co-Training", May 2010, Neural Networks. vol. 23, Issue 4, May 2010, pp. 497-509 (Year: 2010).*
Zhang et al., "Generating Text via Adversarial Training", 2016, Workshop on Adversarial Training, NIPS 2016, pp. 1-6 (Year: 2016).*

* cited by examiner

FIG. 12

DEEP AND WIDE MACHINE LEARNED MODEL FOR JOB RECOMMENDATION

TECHNICAL FIELD

The present disclosure generally relates to technical problems encountered in recommending jobs corresponding to job postings on computer networks. More specifically, the present disclosure relates to the use of a deep and wide machine learning model for job recommendation.

BACKGROUND

The rise of the Internet has occasioned two different but related phenomena: the increase in the presence of social networks, with their corresponding member profiles visible to large numbers of people, and the increase in the use of these social networks to perform searches for jobs that have been posted on or linked to by the social networks. The prevalence of companies posting job postings on the Internet has also led to another, newer, phenomenon, where social networking services and/or other services try to recommend job postings to members without the members having actively searched for such listings.

Various solutions for recommending job postings to members have been proposed. Recently, deep neural networks have yielded success in job posting recommendations. The deep neural network structure can effectively generate non-linear low-dimension dense embedding features without requiring much feature engineering work. These features are suitable for generalization and can greatly reduce the feature dimension, but suffer from over-generalization.

Another solution would be to use a generalized linear model with nonlinearly transformed features. While this has less over-generalization, it relies on feature engineering to generate wide sparse features. Features often don't capture the semantic meaning of members and jobs. For example, there is little cosine similarity between the job titles "application developer" and "software engineer," and yet in the real world there is significant overlap between the two. Additionally, sparse features don't generalize well in a linear model. Furthermore, too many features result in high online scoring latency and difficult fitting.

What is needed is a solution that does not rely on feature engineering while not resulting in over-generalization.

BRIEF DESCRIPTION OF THE DRAWINGS

Some embodiments of the technology are illustrated, by way of example and not limitation, in the figures of the accompanying drawings.

FIG. 12 is a screen capture illustrating how information about one or more job postings may be displayed on a "Jobs you may be interested in" web page from a social networking service, in accordance with an example embodiment.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a deep neural network is used to generate general dense deep features, and a boosting tree is used to generate sparse wide features without extra feature engineering. This deep and wide machine learned model specifically designed for job posting recommendation provides improvement over the performance of a deep model alone.

Figure 1:
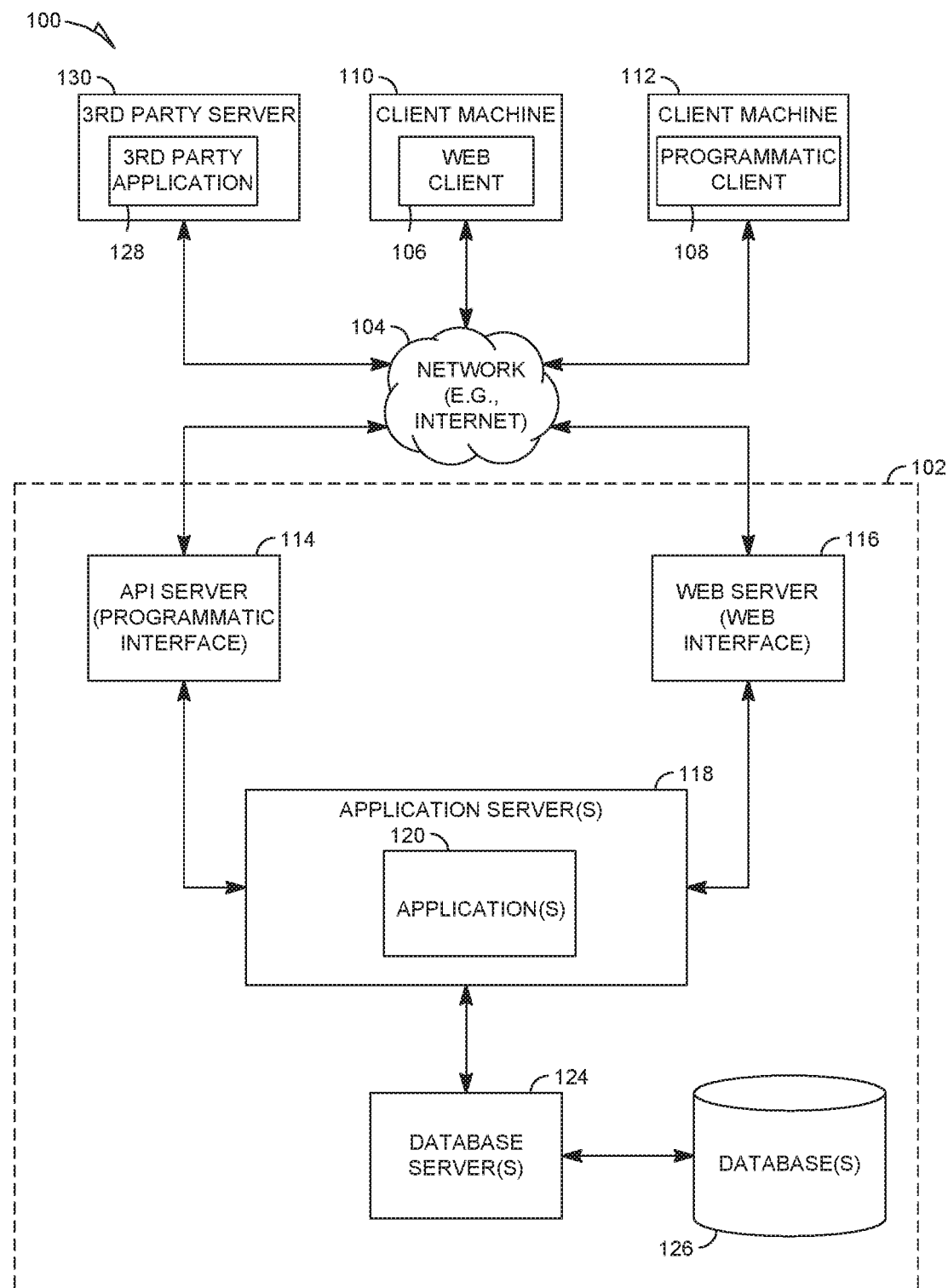
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application programming interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the client machines 110, 112 and the third-party server 130 may be a mobile device) to access and browse online content, such as any of the online content disclosed herein. A mobile server (e.g., the API server 114) may communicate with the mobile app and the application server(s) 118 in order to make the features of the present disclosure available on the mobile device.

Figure 2:
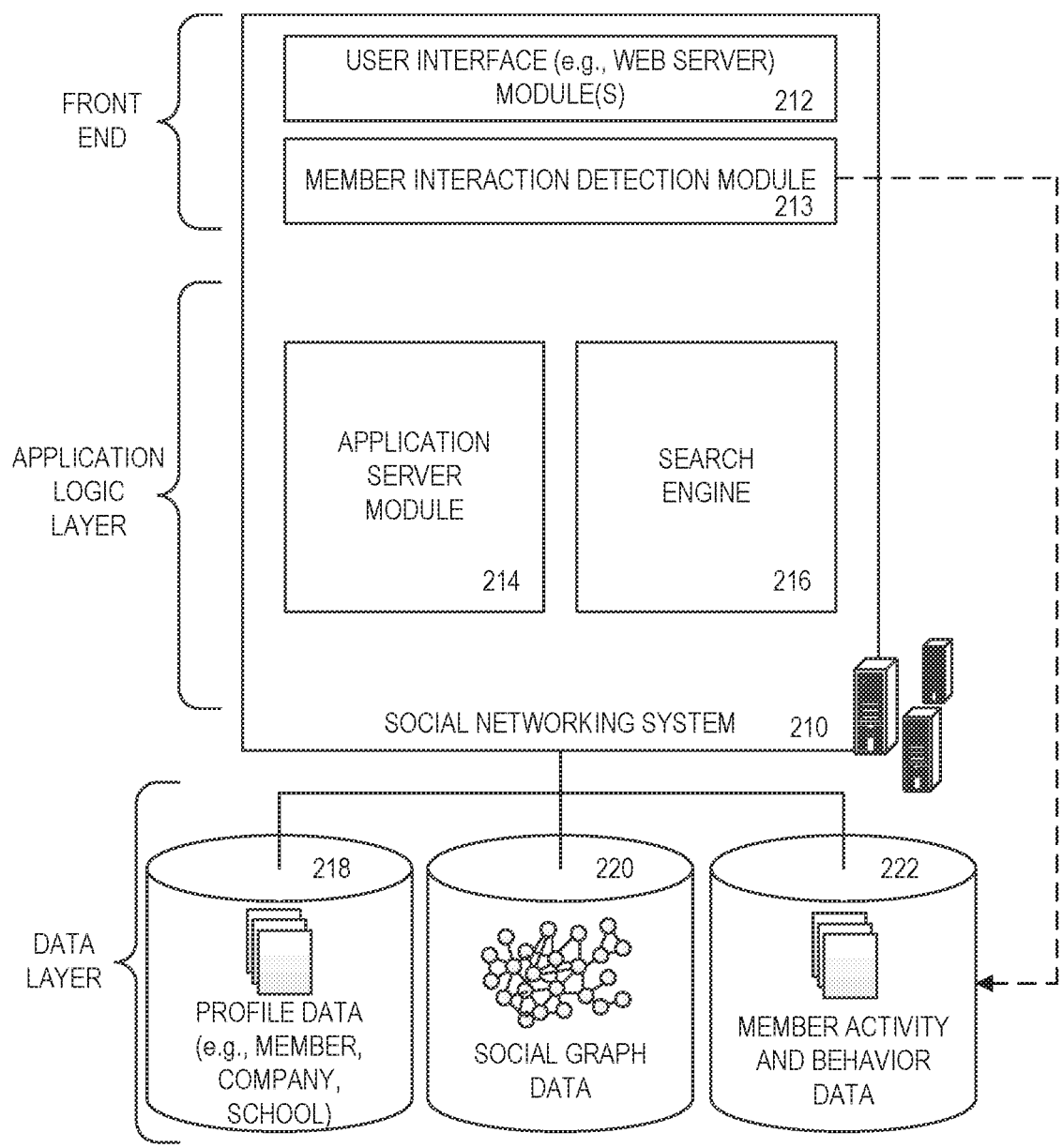
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, "following" another member typically is a unilateral operation and, at least in some embodiments, does not require acknowledgement or approval by the member who is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application 120 may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
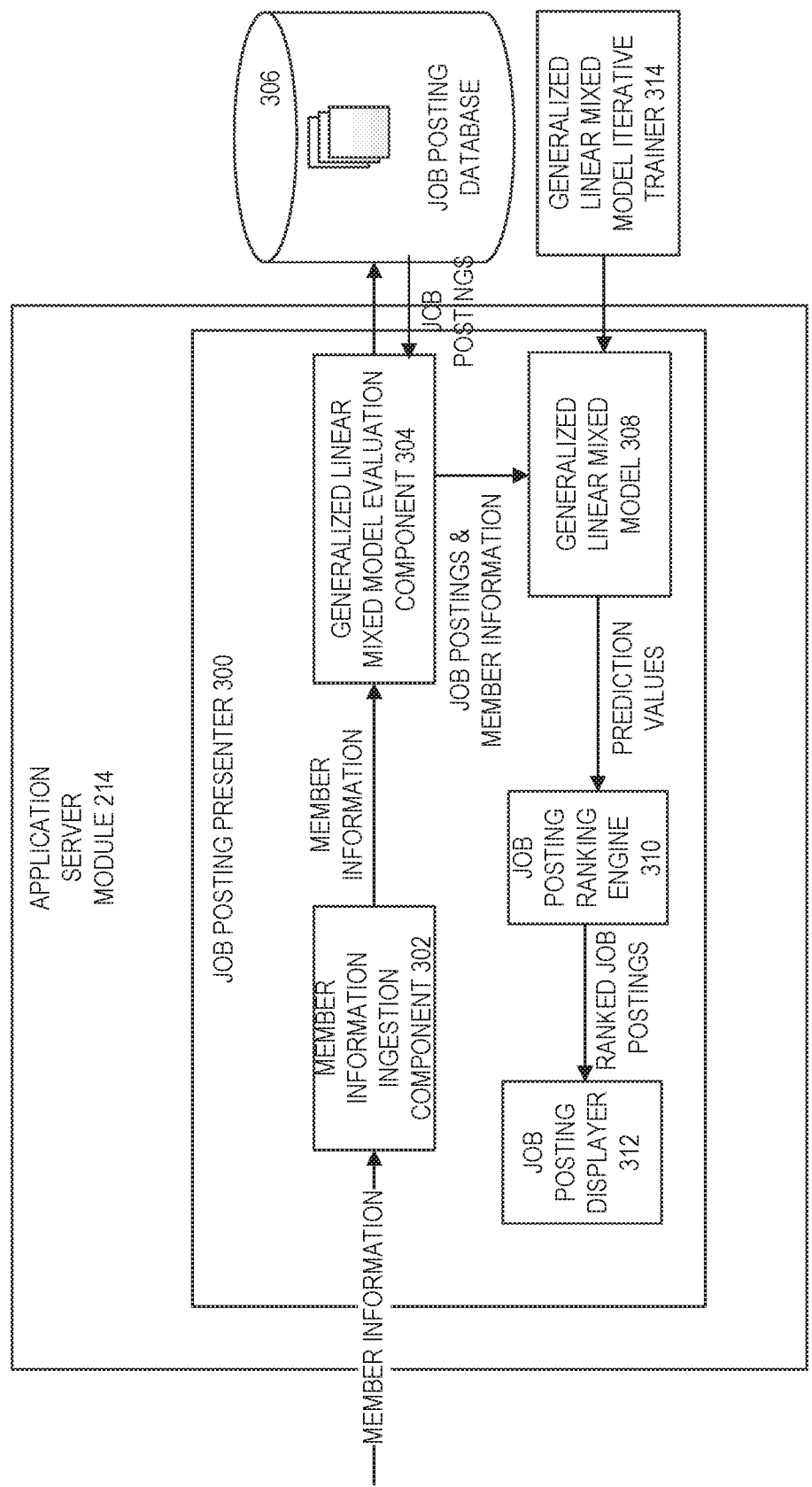
FIG. 3 is a block diagram illustrating an application server module of FIG. 2 in more detail, in accordance with an example embodiment.

FIG. 3 is a block diagram illustrating the application server module 214 of FIG. 2 in more detail, in accordance with an example embodiment. While in many embodiments the application server module 214 will contain many sub-components used to perform various different actions within the social networking system, in FIG. 3 only those components that are relevant to the present disclosure are depicted. The application server module 214 includes a job posting presenter 300. The job posting presenter 300 presents one or more available job postings to a member of a social networking service. A member information ingestion component 302 obtains member information regarding a member of a social networking service. This may be performed in a number of different ways. In one example embodiment, the member information ingestion component 302 receives a member identification that is obtained when a member logs into the social networking service. This member identification is then used to query a member profile database to obtain a member profile for the member. The member profile then contains the member information, such as skills, schools attended, degrees, etc. In another example embodiment, the member information from the member profile is sent to the member information ingestion component 302 without the need for a member identification to be used.

The member information ingestion component 302 forwards the member information to a generalized linear mixed model evaluation component 304, which obtains one or more potential job postings to display from a job posting database 306 and feeds the member information and the one or more potential job postings into a generalized linear mixed model 308, which is designed to output a prediction value for each of the one or more potential job postings based on the member information. The prediction value, as will be described in more detail later, indicates the probability that the member will apply for the job corresponding to the job posting. A job posting ranking engine 310 then ranks the one or more potential job postings based on the prediction values. A job posting displayer 312 then displays the n potential job postings having the highest prediction values in a user interface, such as on a "Jobs you might be interested in" screen of the social networking service's web site or mobile application.

In an example embodiment, the generalized linear mixed model 308 is a deep neural network collaborative filtering model component combined with a wide boosting tree model component. This new deep and wide model can include both general job-member feature matching and specific member-job interaction effects for job recommendations. A sequential training procedure may be used by a generalized linear mixed model iterative trainer 314 to jointly optimize the two models. A new method to generate nonlinear dense and sparse features for recommender systems to reduce feature dimension and include different aspects of nonlinearity is also presented. In an example embodiment, the deep neural network collaborative filtering model component is in a neural collaborative filtering framework.

Figure 4:
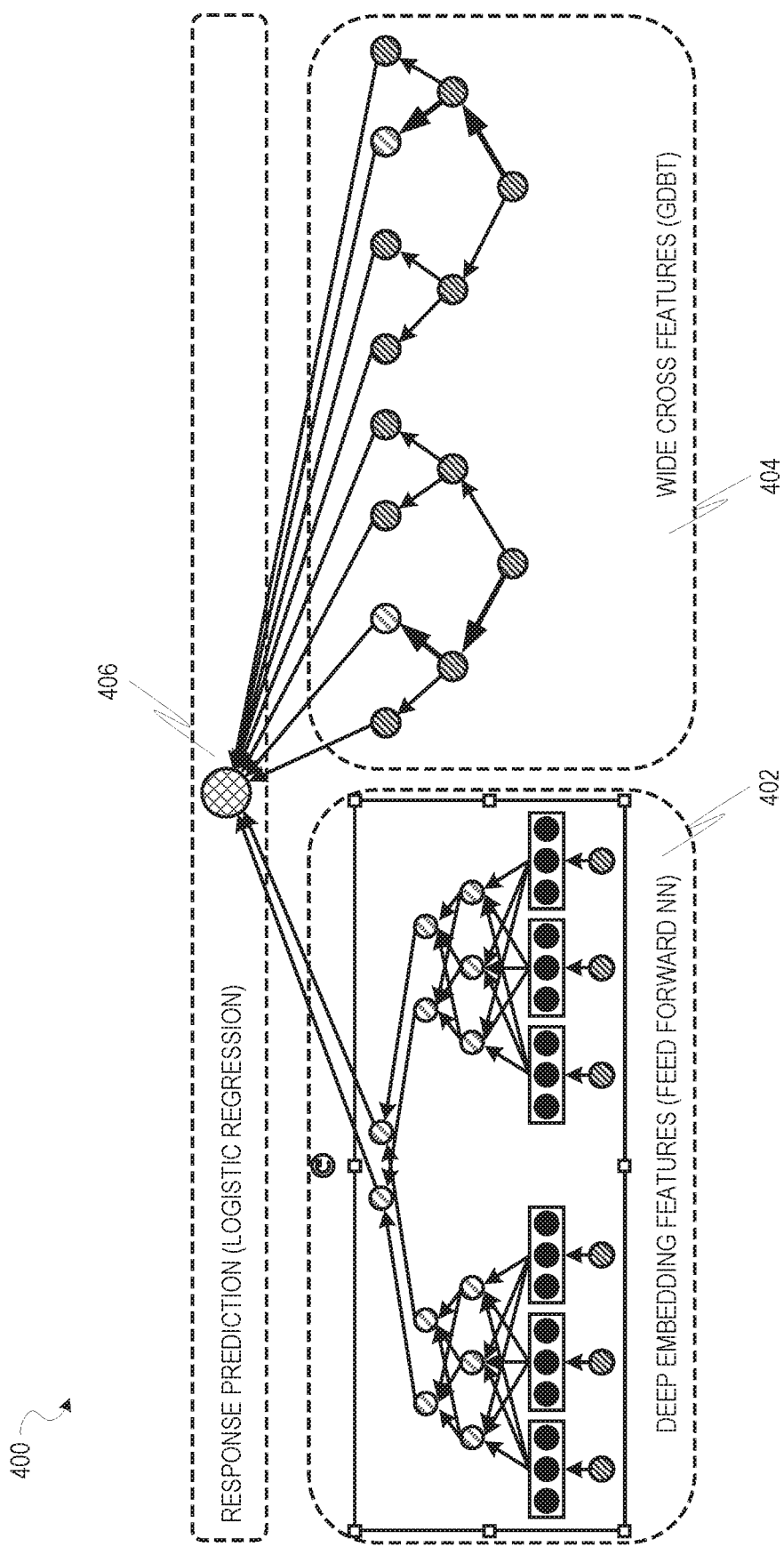
FIG. 4 is a block diagram illustrating a deep and wide machine learned model, in accordance with an example embodiment.

FIG. 4 is a block diagram illustrating a deep and wide machine learned model 400, in accordance with an example embodiment. The deep and wide machine learned model 400 includes a deep neural network collaborative filtering model 402, which is a feed-forward neural network, and a separate boosting decision tree model 404.

The deep neural network collaborative filtering model 402 (the deep part) is a deep neural network, which can be viewed to produce deep interactive features between members and jobs in the model. The boosting decision tree model 404 (the wide part) is a gradient boosting decision trees (GBDT) model, which generates tree-based transformed features.

Figure 5:
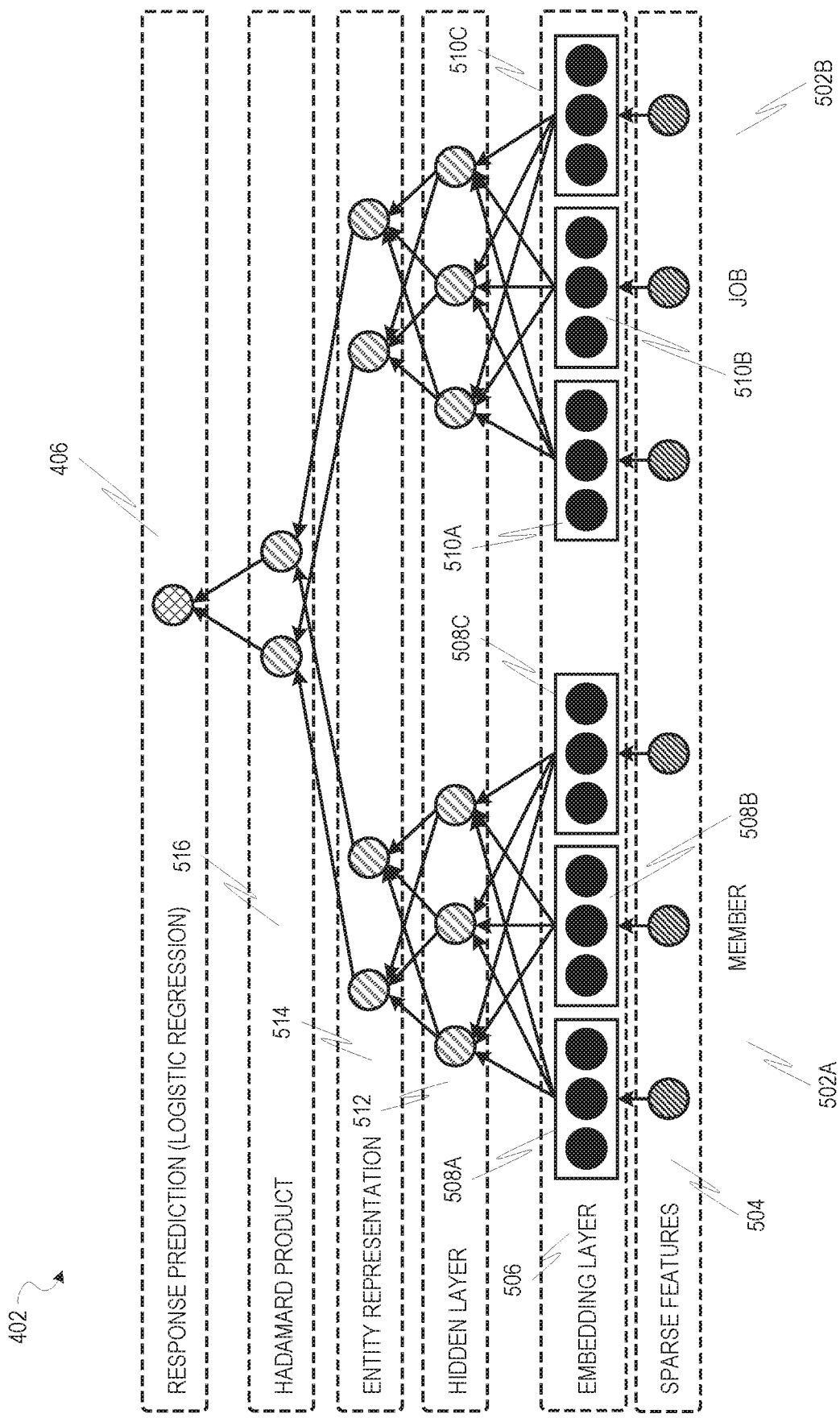
FIG. 5 is a block diagram illustrating a deep neural network collaborative filtering model in more detail, in accordance with an example embodiment.

FIG. 5 is a block diagram illustrating the deep neural network collaborative filtering model 402 in more detail, in accordance with an example embodiment. The deep neural network collaborative filtering model 402 comprises two identity embedding networks, one for a member 502A and one for a job 502B. The embedding networks for the member 502A and the job 502B, respectively, have the same structure: an input layer 504 takes sparse categorical features including three components: title, skill, and company identifications. Above the input layer 504 is an embedding layer 506, which is a fully connected layer that projects each component into a dense latent vector. Then three embedding vectors 508A, 508B, 508C for the member 502A and three embedding vectors 510A, 510B, 510C for the job 502B are concatenated and connected with several fully connected hidden layers 512. Specifically, each hidden layer 512 can be expressed as:

$$X^{(l+1)} = f(W^{(l)} X^{(l)} + b^{(l)})$$

where l is the layer number and f is an activation function, which is rectified linear units (ReLUs) in some example embodiments. $X^{(l)}$, $W^{(l)}$, and $b^{(l)}$ are the (hidden) vector, weights, and bias at the l-th layer. The hidden representations are mapped into new representations in an entity representation layer 514. Finally, a Hadamard product layer 516 performs a Hadamard product on these new representations.

The boosting decision tree model 404 is a powerful way to implement non-linear and tuple transformations for categorical features by useful combination of pruned features. The boosting decision tree model 404 includes a set of one or more classification and regression trees (CARTs), also called an ensemble of trees. Each interior node of each CART corresponds to an input variable. Each leaf of each CART represents the value of a target variable given the input variables represented by the path from the root to the leaf. The boosting decision tree model 404 incrementally builds an ensemble of trees by training each new instance to emphasize the training instances that were previously mismodeled.

Figure 6:
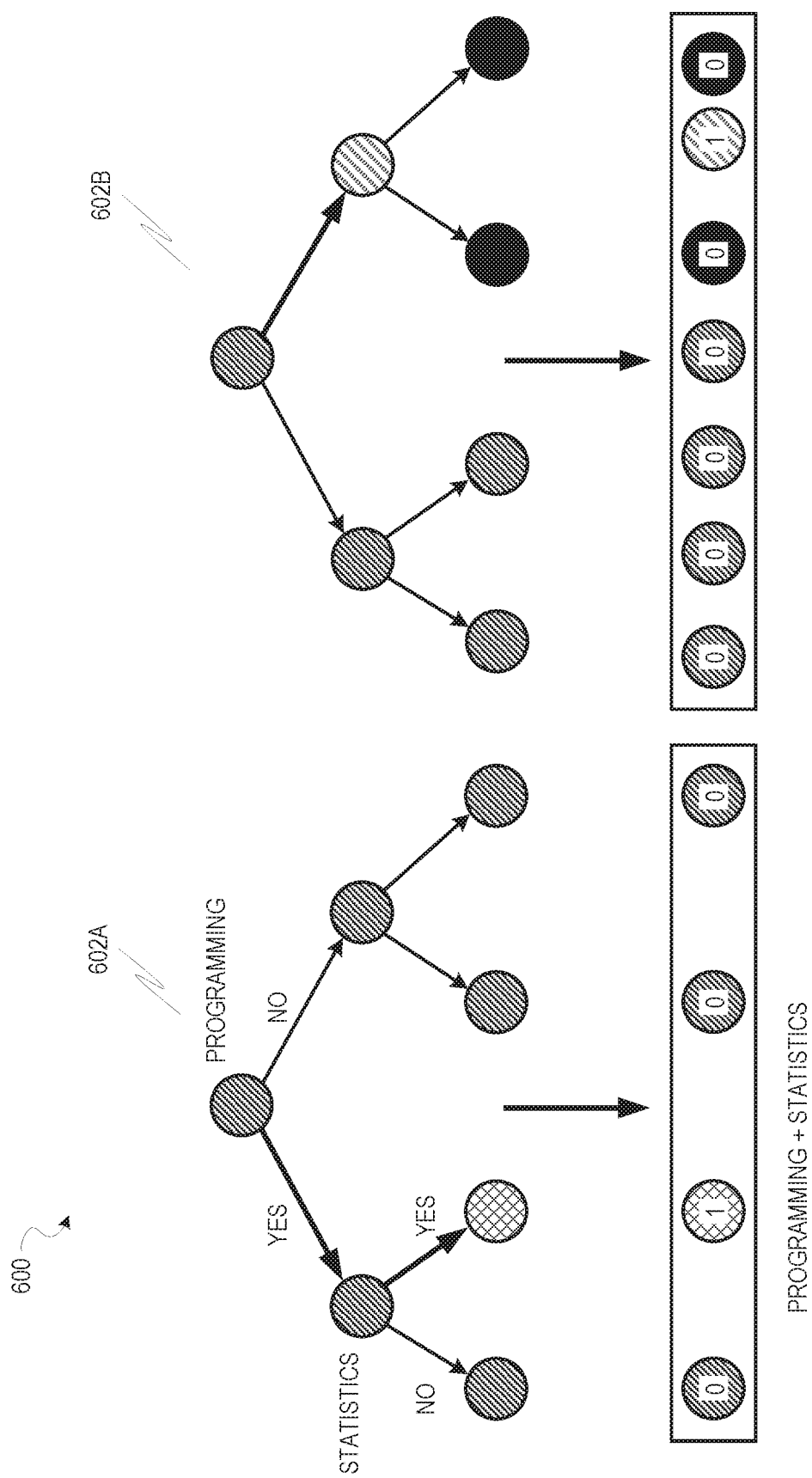
FIG. 6 is a block diagram illustrating an example of an ensemble of trees created by a boosting decision tree model, in accordance with an example embodiment.

FIG. 6 is a block diagram illustrating an example of an ensemble of trees 600 created by the boosting decision tree model 404, in accordance with an example embodiment. Here, the output of each individual tree 602A, 602B can be treated as a categorical feature in a classifier. Each traversal from root node to leaf node encodes a series of feature crosses. The boosting decision tree model 404 learns and selects the most useful combinations of feature crosses.

There are several ways to extract tree features. In an example embodiment, a 1-of-K encoding method may be utilized. For each subtree in the boosting decision tree model 404, it can contain at most $2^{n-1}$ nodes. Hence, each tree can generate a new categorical feature with dimension $2^{n-1}$. Each node can represent the decision path from root to this node, so we treat each node as one dimension of the feature, which represents the nonlinear combination of feature choice along the path. In this example embodiment, only the leaf node can have meaning value 1. In some example embodiments, constant length of the feature for the static computational graph is kept.

The boosting decision tree model 404 uses K additive functions to predict the output:

$$\hat{y}_i = \sum_{k=1}^{K} f_k(x_i) + z_i$$

where $\hat{y}_i$ is the predicted logits for prediction i, $z_i$ is the initial margin, $f_k$ is the tree prediction score function, $x_i$ is the feature, and K is the total number of trees.

The deep neural network collaborative filtering model 402 and boosting decision tree model 404 are linked with a final logistic prediction layer 406.

Figure 7:
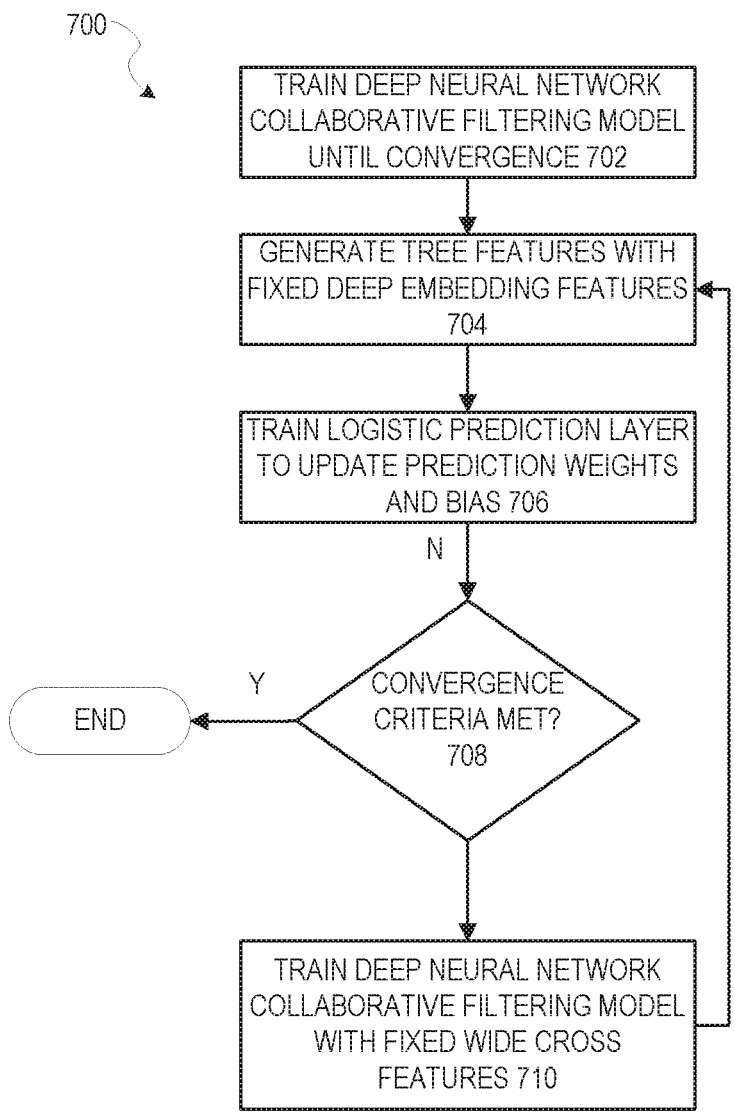
FIG. 7 is a flow diagram illustrating an iterative method to train a boosting decision tree model, in accordance with an example embodiment.

The deep neural network collaborative filtering model 402 and boosting decision tree model 404, however, cannot be jointly trained, since the boosting decision tree model 404 cannot be directly trained on mini-batch, which is a type of Stochastic Gradient Descent where the gradient is estimated by looking at a small number of examples rather than the entire dataset. Since there is no notion of a gradient, however, for a tree split node parameter, the trees cannot be trained via gradient descent methods. Instead trees are trained greedily by picking the best split node at a time that maximizes information gain. As a result, in an example embodiment, the deep model and the wide model are treated as separate block-wise coordinates to be optimized. Specifically, an iterative way to train the boosting decision tree model 404 is provided. FIG. 7 is a flow diagram illustrating an iterative method 700 to train a boosting decision tree model 404, in accordance with an example embodiment.

First, at operation 702, the deep neural network collaborative filtering model 402 is trained until convergence (stable loss). During this step, the boosting decision tree model 404 is not initialized. Thus, in the computational graph, the boosting decision tree model 404 produces all zero features into the logistic prediction layer 406.

Then, at operation 704, the boosting decision tree model 404 generates tree features with fixed deep embedding features from the deep neural network collaborative filtering model 402. With the logits of the deep neural network collaborative filtering model 402 as an original margin, in trees are boosted sequentially. The tree transformed features can then be generated from the leaf nodes by 1-of-K encoding.

At operation 706, with the fixed deep Hadamard features from the deep neural network collaborative filtering model 402 and tree transformed features from the boosting decision tree model 404 as input, the logistic prediction layer 406 is trained to update the prediction weights and bias. At operation 708, convergence criteria are measured. If it is determined that the convergence criteria are met, then the method 700 ends. Otherwise, the method 700 proceeds to operation 710, where the deep neural network collaborative filtering model 402 is trained with the fixed wide cross features. Then the method 700 loops back to operation 704.

Figure 8:
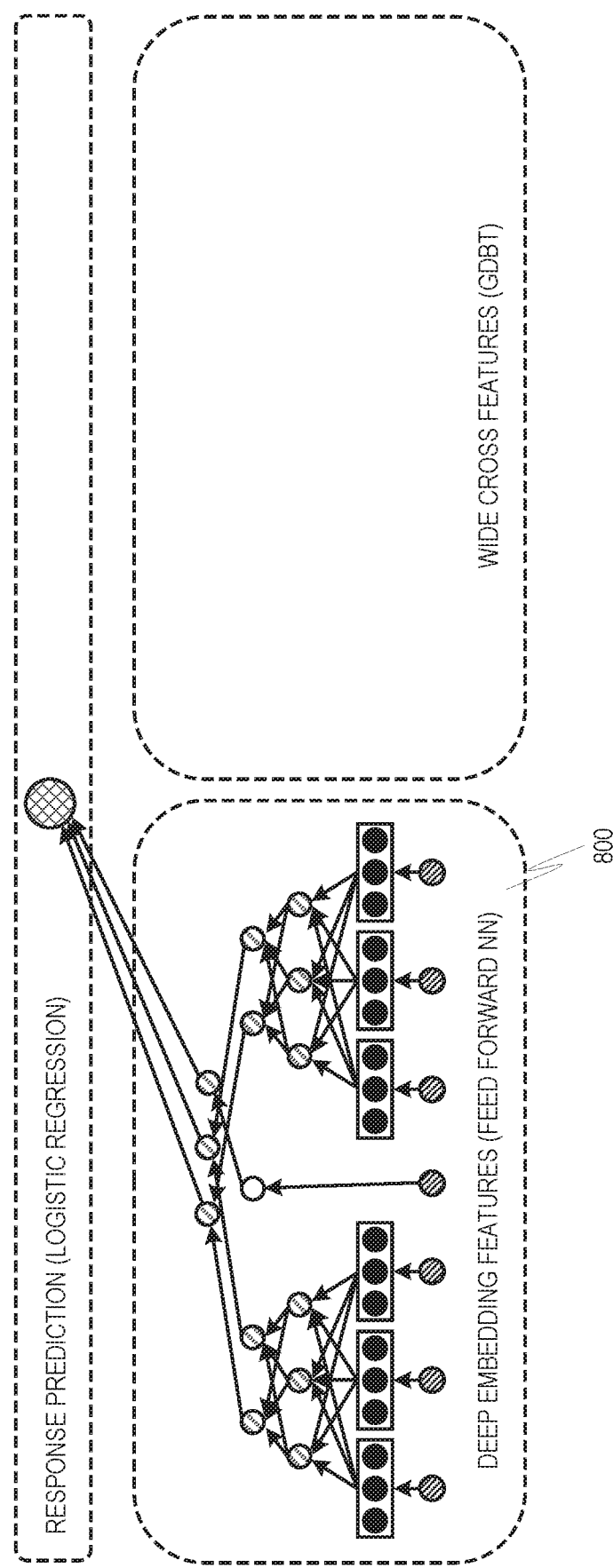
FIGS. 8-11 are block diagrams illustrating an example run-through of the method of FIG. 7, in accordance with an example embodiment.
Figure 9:
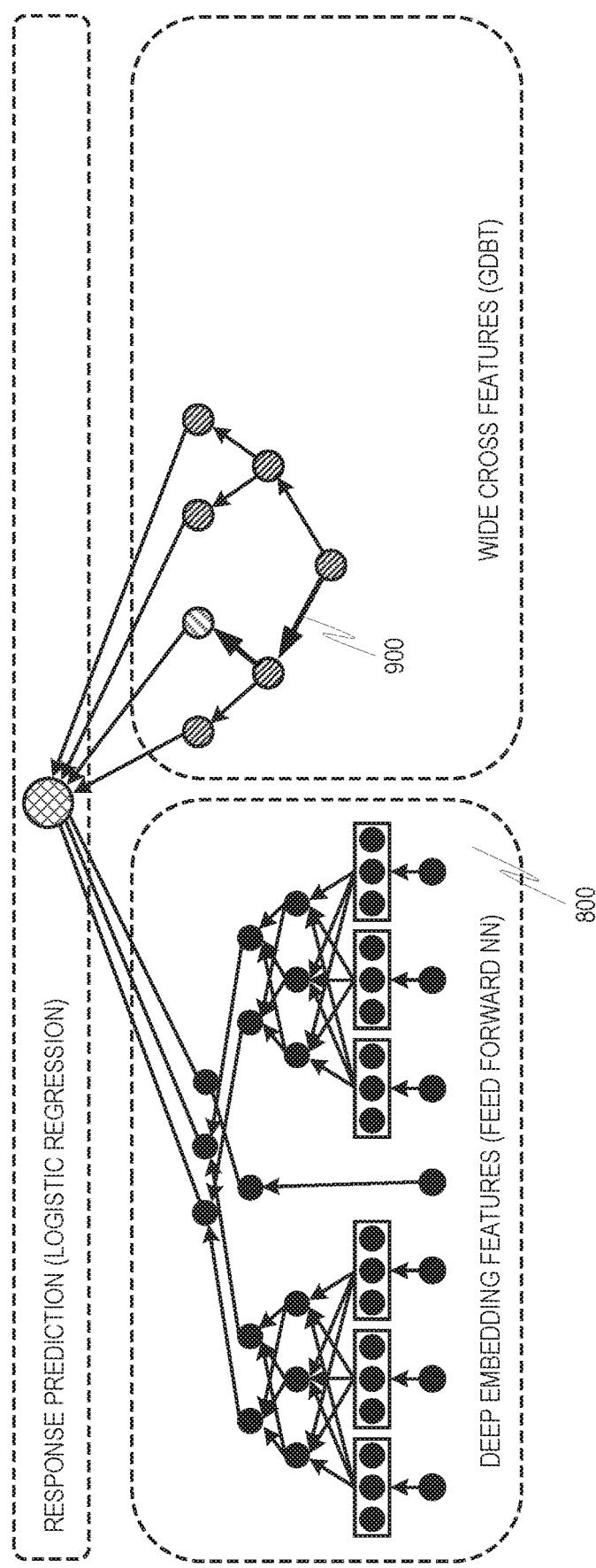
Figure 10:
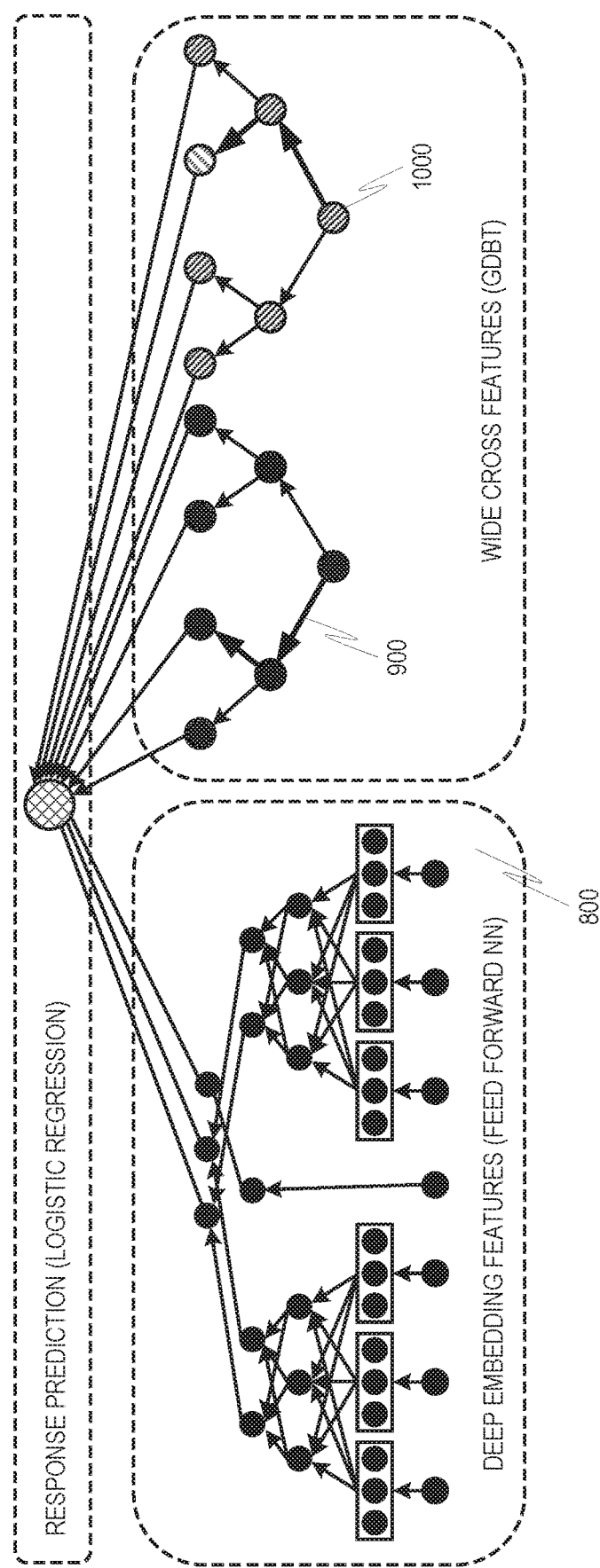
Figure 11:
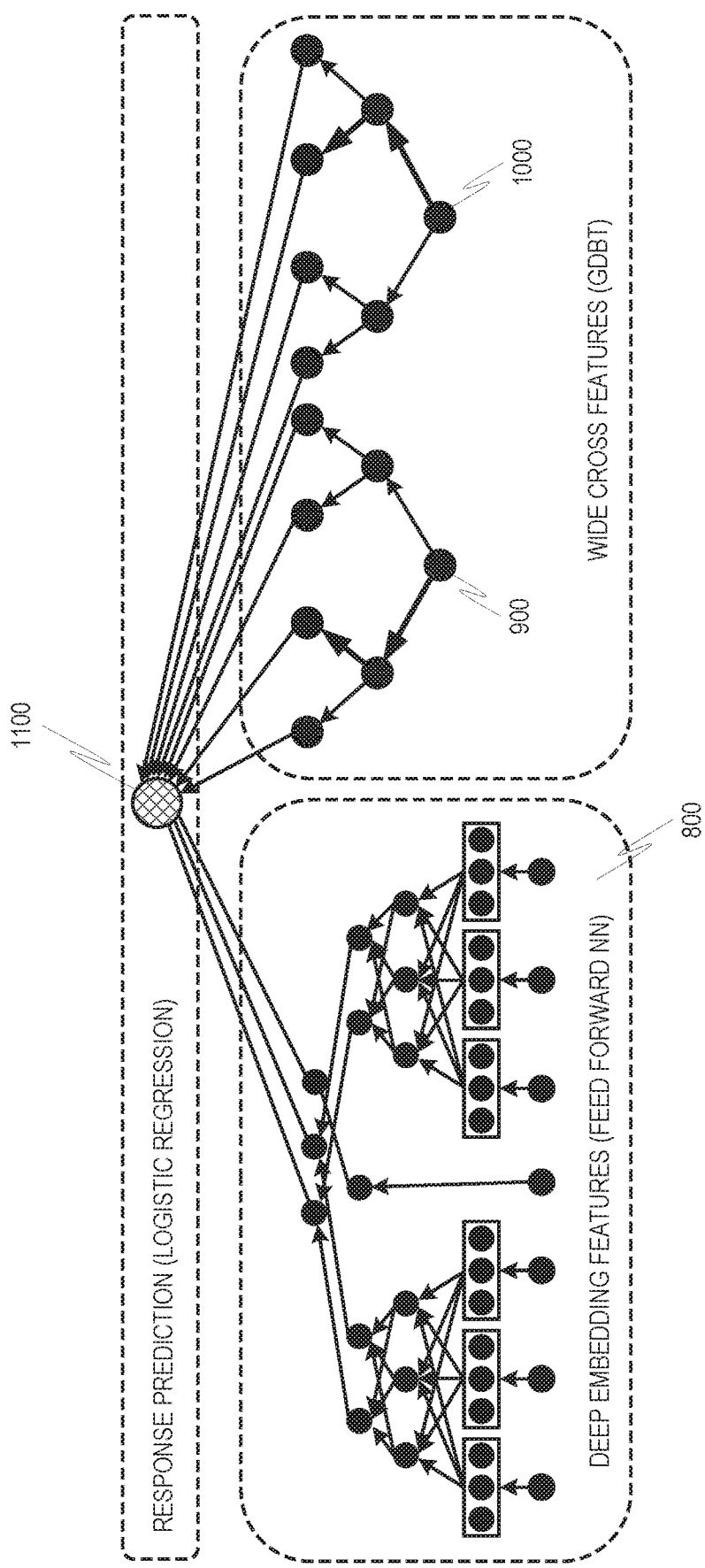

FIGS. 8-11 are block diagrams illustrating an example run-through of the method 700 of FIG. 7, in accordance with an example embodiment. Referring first to FIG. 8, a deep neural network collaborative filtering model 800 is trained until convergence, as an initial margin. Referring to FIG. 9, a first gradient boosting decision tree 900 is trained using the deep neural network collaborative filtering model 800 as a margin. Referring to FIG. 10, a second gradient boosting decision tree 1000 is trained using the deep neural network collaborative filtering model 800 and the first decision tree 900 as a margin. Referring to FIG. 11, a prediction layer 1100 is trained with the fixed deep neural network collaborative filtering model 800, first gradient boosting decision tree 1300, and second gradient boosting decision tree 1000. Assuming that the convergence criteria have not been met, the deep neural network collaborative filtering model 800 is then retrained with the fixed first gradient boosting decision tree 900 and second gradient boosting decision tree 1000.

In an example embodiment, the above techniques are applied to member information (such as member skills, degree/education, connections, career history, etc.) and job posting information (e.g., job title, description, location, company) in a social networking service. Thus, for example, the deep neural network collaborative filtering model 800 learns features important to predicting whether a particular member will apply for a particular job. Additionally, the first gradient boosting decision tree 900 may be built for job titles and the second gradient boosting decision tree 1000 may be built for member information. Once the training described above is completed, a generalized linear mixed model that combines the deep neural network collaborative filtering model 800, the first gradient boosting decision tree 900, and the second gradient boosting decision tree 1000 via the prediction layer 1100 may be passed input member data, such as a member profile, at runtime along with job titles corresponding to one or more job postings, producing a prediction of whether the corresponding member would be interested in applying for each job. In that manner, the member may be presented with job postings that the member may be interested in without needing to actively search for such job postings.

Figure 12:
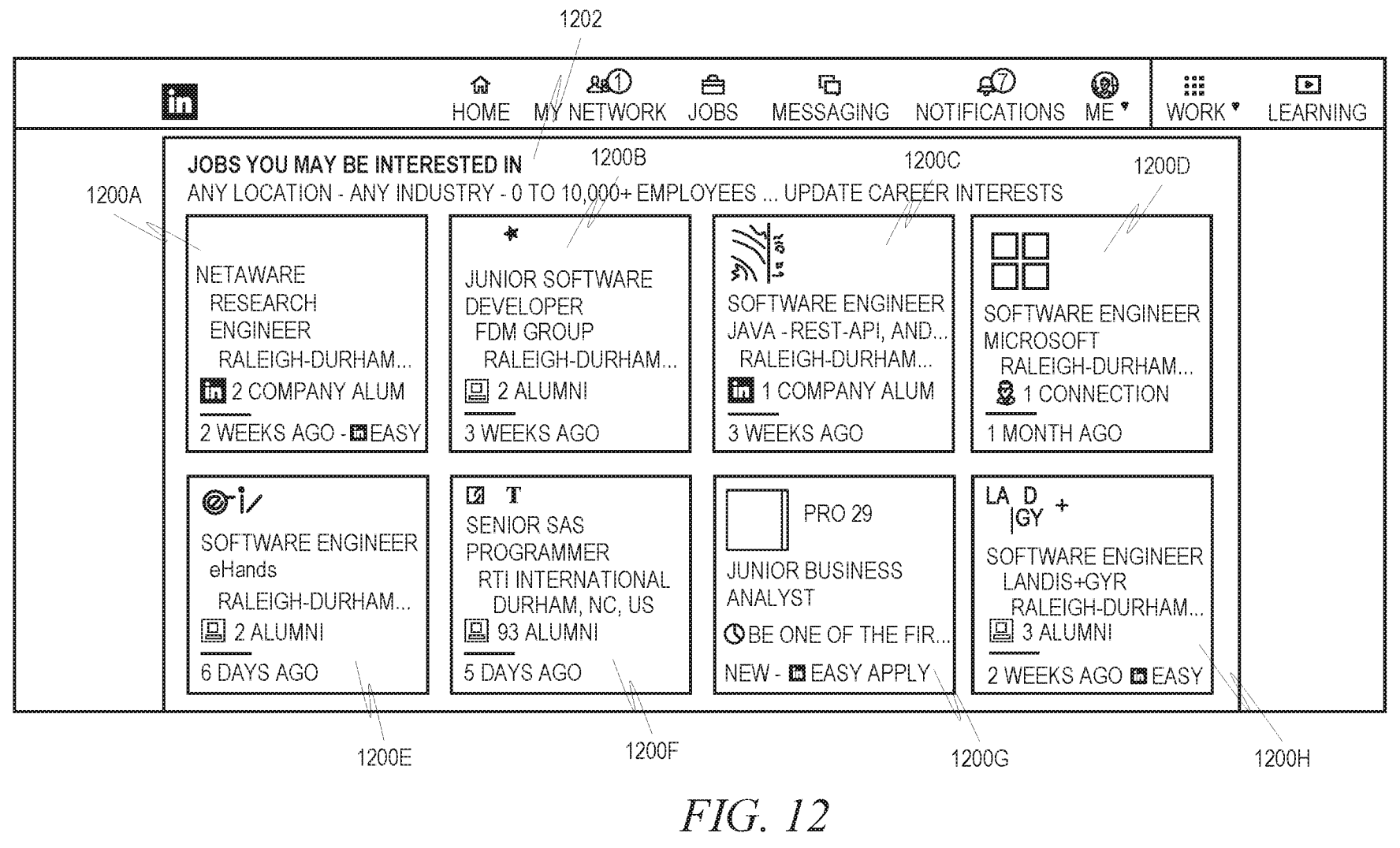

FIG. 12 is a screen capture illustrating how information about one or more job postings 1200A-1200H may be displayed on a "Jobs you may be interested in" web page 1202 from a social networking service, in accordance with an example embodiment.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-12 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 13:
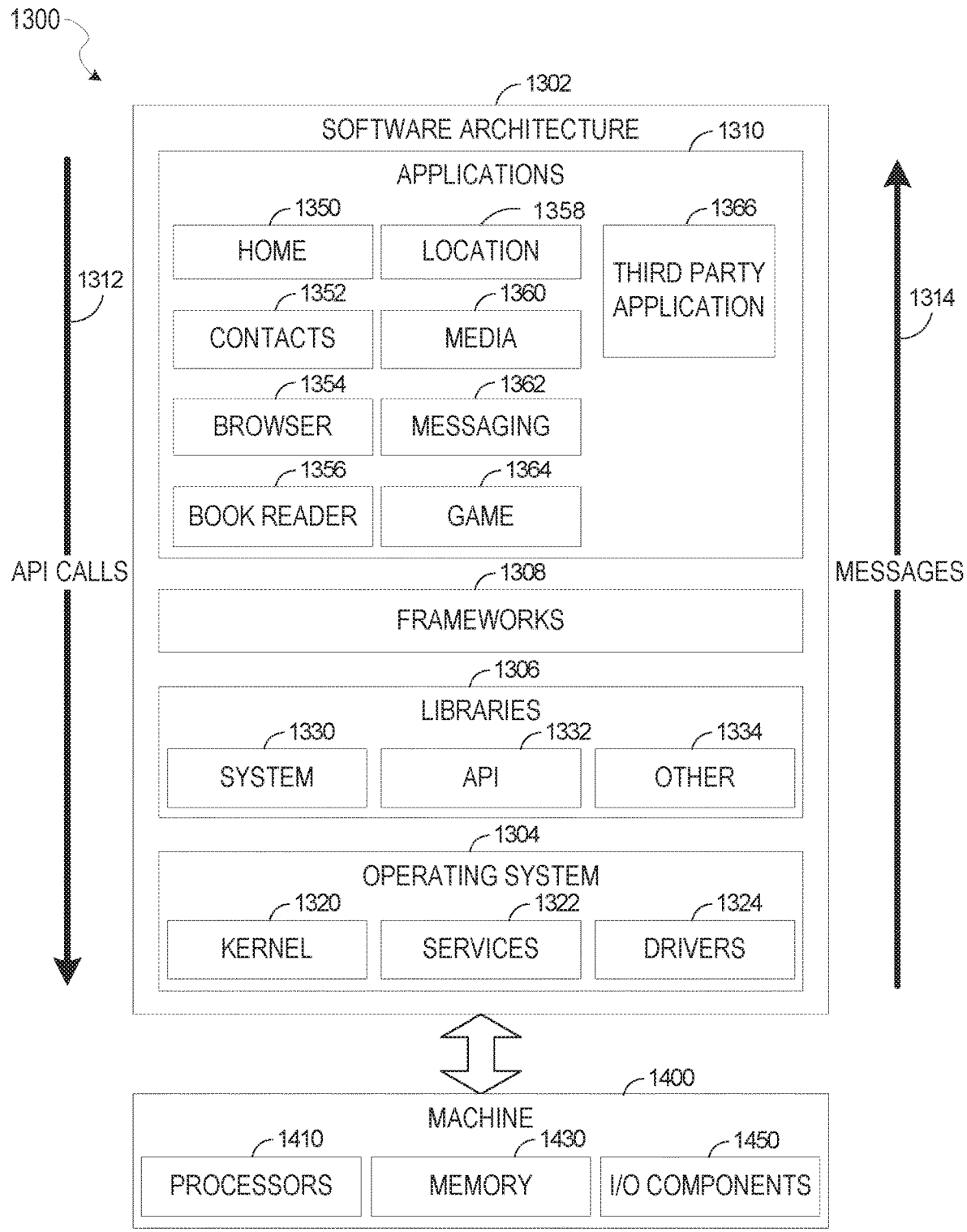
FIG. 13 is a block diagram illustrating a representative software architecture, which may be used in conjunction with various hardware architectures herein described.

FIG. 13 is a block diagram 1300 illustrating a representative software architecture 1302, which may be used in conjunction with various hardware architectures herein described. FIG. 13 is merely a non-limiting example of a software architecture, and it will be appreciated that many other architectures may be implemented to facilitate the functionality described herein. The software architecture 1302 may be executing on hardware such as a machine 1400 of FIG. 14 that includes, among other things, processors 1410, memory/storage 1430, and I/O components 1450. A representative hardware layer 1400 is illustrated and can represent, for example, the machine 1400 of FIG. 14. The representative hardware layer 1400 comprises one or more processors 1410. The executable instructions represent the executable instructions of the software architecture 1302, including implementation of the methods, modules, and so forth of FIGS. 1-12. The hardware layer 1400 also includes the memory/storage 1430, which also has the executable instructions.

In the example architecture of FIG. 13, the software architecture 1302 may be conceptualized as a stack of layers where each layer provides particular functionality. For example, the software architecture 1302 may include layers such as an operating system 1304, libraries 1306, frameworks/middleware 1308, and applications 1310. Operationally, the applications 1310 and/or other components within the layers may invoke API calls 1312 through the software stack and receive responses, returned values, and so forth, illustrated as messages 1314, in response to the API calls 1312. The layers illustrated are representative in nature and not all software architectures have all layers. For example, some mobile or special-purpose operating systems may not provide a layer of frameworks/middleware 1308, while others may provide such a layer. Other software architectures may include additional or different layers.

The operating system 1304 may manage hardware resources and provide common services. The operating system 1304 may include, for example, a kernel 1320, services 1322, and drivers 1324. The kernel 1320 may act as an abstraction layer between the hardware and the other software layers. For example, the kernel 1320 may be responsible for memory management, processor management (e.g., scheduling), component management, networking, security settings, and so on. The services 1322 may provide other common services for the other software layers. The drivers 1324 may be responsible for controlling or interfacing with the underlying hardware. For instance, the drivers 1324 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1306 may provide a common infrastructure that may be utilized by the applications 1310 and/or other components and/or layers. The libraries 1306 typically provide functionality that allows other software modules to perform tasks in an easier fashion than by interfacing directly with the underlying operating system 1304 functionality (e.g., kernel 1320, services 1322, and/or drivers 1324). The libraries 1306 may include system libraries 1330 (e.g., C standard library) that may provide functions such as memory allocation functions, string manipulation functions, mathematical functions, and the like. In addition, the libraries 1306 may include API libraries 1332 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1306 may also include a wide variety of other libraries 1334 to provide many other APIs to the applications 1310 and other software components/modules.

The frameworks 1308 (also sometimes referred to as middleware) may provide a higher-level common infrastructure that may be utilized by the applications 1310 and/or other software components/modules. For example, the frameworks 1308 may provide various graphic user interface (GUI) functions, high-level resource management, high-level location services, and so forth. The frameworks 1308 may provide a broad spectrum of other APIs that may be utilized by the applications 1310 and/or other software components/modules, some of which may be specific to a particular operating system 1304 or platform.

The applications 1310 include third-party applications 1366. Examples of representative built-in applications may include, but are not limited to, a home application 1350, a contacts application 1352, a browser application 1354, a book reader application 1356, a location application 1358, a media application 1360, a messaging application 1362, and/or a game application 1364. The third-party applications 1366 may include any of the built-in applications as well as a broad assortment of other applications. In a specific example, the third-party application 1366 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1366 may invoke the API calls 1312 provided by the mobile operating system such as the operating system 1304 to facilitate functionality described herein.

The applications 1310 may utilize built-in operating system 1304 functions (e.g., kernel 1320, services 1322, and/or drivers 1324), libraries 1306 (e.g., system libraries 1330, API libraries 1332, and other libraries 1334), and frameworks/middleware 1308 to create user interfaces to interact with users of the system. Alternatively, or additionally, in some systems, interactions with a user may occur through a presentation layer. In these systems, the application/module "logic" can be separated from the aspects of the application/module that interact with a user.

Example Machine Architecture and Machine-Readable Medium

Figure 14:
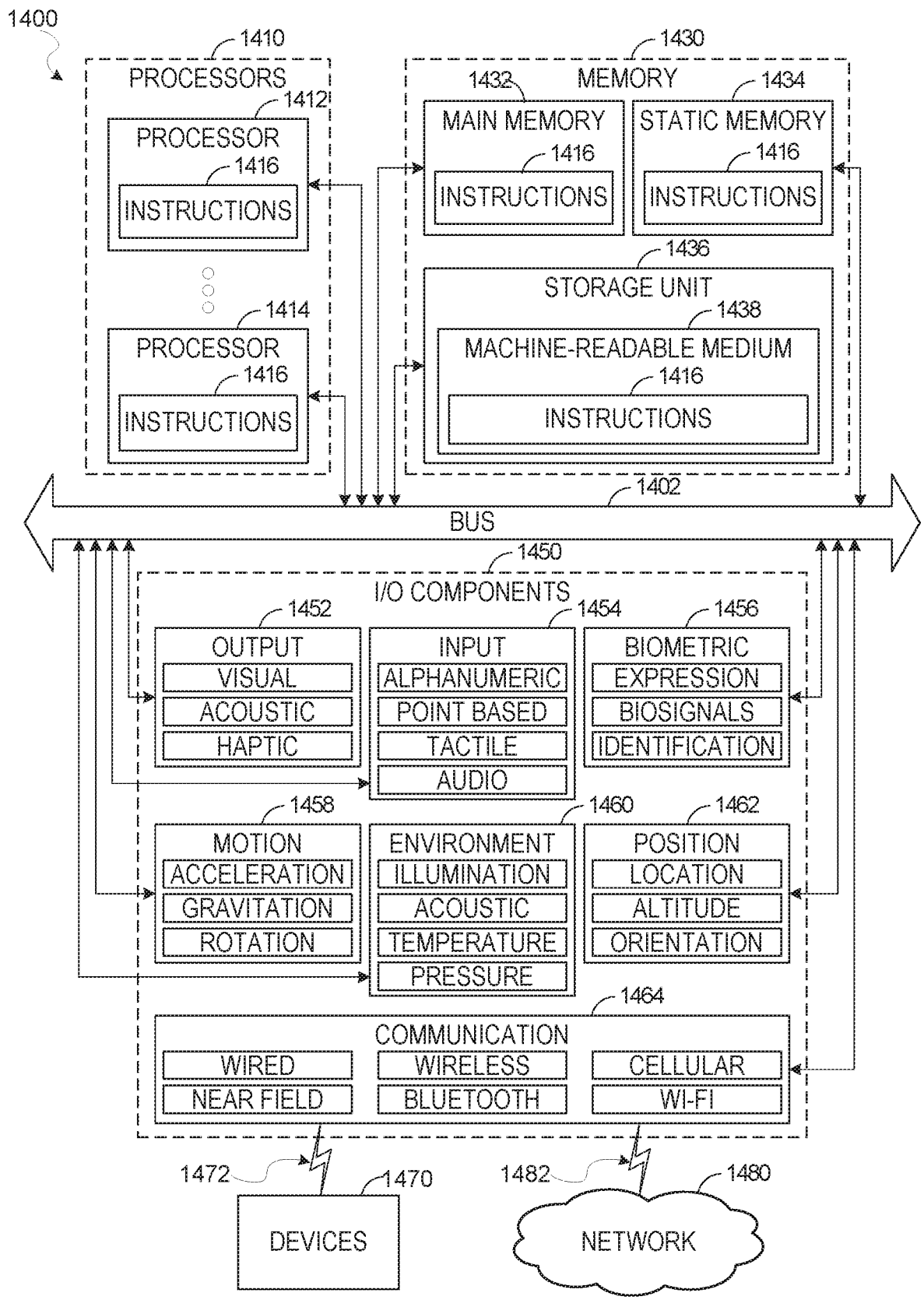
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. The instructions 1416 transform the general, non-programmed machine into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute the instructions 1416 contemporaneously. Although FIG. 14 shows multiple processors 1410, the machine 1400 may include a single processor 1412 with a single core, a single processor 1412 with multiple cores (e.g., a multi-core processor 1412), multiple processors 1410 with a single core, multiple processors 1410 with multiple cores, or any combination thereof.

The memory/storage 1430 may include a memory 1432, such as a main memory, or other memory storage, such as a static memory 1434, and a storage unit 1436, each accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of the processors 1410 are examples of machine-readable media 1438.

As used herein, "machine-readable medium" means a device able to store the instructions 1416 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., the instructions 1416) for execution by a machine (e.g., the machine 1400), such that the instructions, when executed by one or more processors of the machine (e.g., the processors 1410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or other suitable device to interface with the network 1480. In further examples, the communication components 1464 may include wired communication components, wireless communication components, cellular communication components, near-field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF47, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.
Transmission Medium In various example embodiments, one or more portions of the network 1480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, the instructions 1416 may be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.
Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   a memory storing a generalized linear mixed model (GLMM), the GLMM comprising a deep neural network collaborative filtering model and a boosting decision tree model connected via a prediction layer; and
   a computer-readable medium having instructions stored thereon, which, when executed by a processor, cause the system to:
   initialize features in the boosting decision tree model to set values for the features to zero;
   while the features in the boosting decision tree model remain zero, train the deep neural network collaborative filtering model;
   boost one or more trees in the boosting decision tree model using logits produced by the training of the deep neural network collaborative filtering model as a margin;
   train the prediction layer using features from the deep neural network collaborative filtering model and features from the boosting decision tree model;
   determine whether a set of convergence criteria is met; and
   in response to a determination that the set of convergence criteria is not met:
   retrain the deep neural network collaborative filtering model using the features in the boosting decision tree model; and
   repeat the boosting, training, determining, and retraining until the set of convergence criteria is met.

2. The system of claim 1, wherein the GLMM takes member information and job title information from a social networking service and outputs a prediction value as to whether a member corresponding to the member information would apply to a job posting corresponding to the job title information.

3. The system of claim 1, wherein the boosting decision tree model has at least two trees, one tree corresponding to member information and one tree corresponding to job title information.

4. The system of claim 2, wherein the instructions further cause the system to:
   pass the member information and job title information corresponding to a plurality of job postings in the social networking service to the GLMM to obtain a plurality of prediction values; and
   display information regarding job postings having job title information that produce highest of the prediction values to the member via a computer display.

5. The system of claim 1, wherein the deep neural network collaborative filtering model has two identity embedding networks, one for member information and one for job information.

6. The system of claim 5, wherein the identity embedding network for the member information has an identical structure to the identity embedding network for the job information.

7. The system of claim 6, wherein the identity embedding network for the member information has an input layer that takes sparse categorical features, an embedding layer that projects each categorical feature into a dense latent vector, one or more hidden layers concatenating and connecting the dense latent vectors, an entity representation layer in which the one or more hidden layers are mapped, and a Hadamard product layer that performs a Hadamard product on entities in the entity representation layer.

8. A computerized method comprising:
   initializing features in a boosting decision tree model to set values for the features to zero, the boosting decision tree model located in a GLMM and connected to a deep neural network collaborative filtering model via a prediction layer;
   while the features in the boosting decision tree model remain zero, training the deep neural network collaborative filtering model;
   boosting one or more trees in the boosting decision tree model using logits produced by the training of the deep neural network collaborative filtering model as a margin;
   training the prediction layer using features from the deep neural network collaborative filtering model and features from the boosting decision tree model;
   determining whether a set of convergence criteria is met; and
   in response to a determination that the set of convergence criteria is not met:
   retraining the deep neural network collaborative filtering model using the features in the boosting decision tree model; and
   repeating the boosting, training, determining, and retraining until the set of convergence criteria is met.

9. The method of claim 8, wherein the GLMM takes member information and job title information from a social networking service and outputs a prediction value as to whether a member corresponding to the member information would apply to a job posting corresponding to the job title information.

10. The method of claim 8, wherein the boosting decision tree model has at least two trees, one tree corresponding to member information and one tree corresponding to job title information.

11. The method of claim 9, further comprising:
passing the member information and job title information corresponding to a plurality of job postings in the social networking service to the GLMM to obtain a plurality of prediction values; and
displaying information regarding job postings having job title information that produce highest of the prediction values to the member via a computer display.

12. The method of claim 8, wherein the deep neural network collaborative filtering model has two identity embedding networks, one for member information and one for job information.

13. The method of claim 12, wherein the identity embedding network for the member information has an identical structure to the identity embedding network for the job information.

14. The method of claim 13, wherein the identity embedding network for the member information has an input layer that takes sparse categorical features, an embedding layer that projects each categorical feature into a dense latent vector, one or more hidden layers concatenating and connecting the dense latent vectors, an entity representation layer in which the one or more hidden layers are mapped, and a Hadamard product layer that performs a Hadamard product on entities in the entity representation layer.

15. A non-transitory machine-readable storage medium comprising instructions, which when implemented by one or more machines, cause the one or more machines to perform operations comprising:
initializing features in a boosting decision tree model to set values for the features to zero, the boosting decision tree model located in a GLMM and connected to a deep neural network collaborative filtering model via a prediction layer;
while the features in the boosting decision tree model remain zero, training the deep neural network collaborative filtering model;
boosting one or more trees in the boosting decision tree model using logits produced by the training of the deep neural network collaborative filtering model as a margin;
training the prediction layer using features from the deep neural network collaborative filtering model and features from the boosting decision tree model;
determining whether a set of convergence criteria is met; and
in response to a determination that the set of convergence criteria is not met:
retraining the deep neural network collaborative filtering model using the features in the boosting decision tree model; and
repeating the boosting, training, determining, and retraining until the set of convergence criteria is met.

16. The non-transitory machine-readable storage medium of claim 15, wherein the GLMM takes member information and job title information from a social networking service and outputs a prediction value as to whether a member corresponding to the member information would apply to a job posting corresponding to the job title information.

17. The non-transitory machine-readable storage medium of claim 15, wherein the boosting decision tree model has at least two trees, one tree corresponding to member information and one tree corresponding to job title information.

18. The non-transitory machine-readable storage medium of claim 16, wherein the operations further comprise:
passing the member information and job title information corresponding to a plurality of job postings in the social networking service to the GLMM to obtain a plurality of prediction values; and
displaying information regarding job postings having job title information that produce highest of the prediction values to the member via a computer display.

19. The non-transitory machine-readable storage medium of claim 15, wherein the deep neural network collaborative filtering model has two identity embedding networks, one for member information and one for job information.

20. The non-transitory machine-readable storage medium of claim 19, wherein the identity embedding network for the member information has an identical structure to the identity embedding network for the job information.

* * * * *

UNITED STATES PATENT AND TRADEMARK OFFICE
CERTIFICATE OF CORRECTION

PATENT NO. : 10,990,899 B2
APPLICATION NO. : 15/674968
DATED : April 27, 2021
INVENTOR(S) : Le et al.

Page 1 of 1

It is certified that error appears in the above-identified patent and that said Letters Patent is hereby corrected as shown below:

In the Claims

In Column 19, Line 26, in Claim 14, delete "lavers" and insert --layers-- therefor Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*